Patented June 18, 1946

2,402,483

UNITED STATES PATENT OFFICE 2,402,483

CATALYTIC POLYMERIZATION OF UNSATURATED ESTERS

David E. Adelson, Berkeley, Calif., Robert P. Ruh, Columbus, Ohio, and Harold F. Gray, Jr., Berkeley, Calif., assignors to Shell Development Company, San Francisco, Calif., a corporation of Delaware No Drawing. Application June 14, 1943, Serial No. 490,951

8 Claims. (Cl. 260—80)

This invention relates to a process for the catalytic polymerization of unsaturated esters. More particularly, the invention pertains to polymerization of allyl esters and related compounds, the polymerization being effected catalytically by the presence of a new class of polymerization catalysts consisting of certain metal salts.

Unsaturated esters of the type of allyl acetate obtainable from a monocarboxylic acid which is devoid of any polymerizable unsaturated group and an unsaturated alcohol having an olefinic linkage between two carbon atoms one of which is directly linked to a saturated carbon atom having a hydroxyl group linked directly thereto, are compounds which may be termed difficultly polymerizable substances. While the action of heat, light or peroxidic substances has been used to obtain polymers from unsaturated esters of this type, none effects a rapid polymerization of the compounds, and each of such catalysts is accompanied with certain disadvantages which are overcome by the present invention.

It is an object of the present invention to provide a method of polymerizing allyl acetate and related compounds.

Another object is to provide a process for obtaining polymers of unsaturated esters of the type of allyl acetate employing as catalytic agent therefor a class of metal salts.

A further object is to provide a class of new polymerization catalysts.

These and other objects will be apparent from the description of the invention given hereinafter.

We have now discovered that allyl acetate and related compounds are catalytically polymerized when heated in the presence of certain di-halide salts of cadmium, mercury or lead. The catalysts are cadmium, mercury or lead halides wherein the halide has an atomic number less than that of iodine. The salts employed as catalysts in the present invention may be represented by the formula $MX_2$ wherein M denotes cadmium, mercury or lead, and X denotes fluorine, chlorine, or bromine. Specifically the salts employed as catalysts are $CdF_2$, $CdCl_2$, $CdBr_2$, $HgF_2$, $HgCl_2$, $HgBr_2$, $PbF_2$, $PbCl_2$, and $PbBr_2$. Anhydrous salts are used as catalysts, i. e. those devoid of water of crystallization.

A number of these salts were tested for polymerization activity by heating with allyl acetate, a difficultly polymerizable ester. The monomeric allyl acetate was substantially pure and anhydrous and to separate quantities was added about 0.5% of the salts indicated in Table I below. The esters in the presence of the salts were refluxed or boiled at normal pressure in a vessel fitted with a reflux condenser and the course of the polymerization was followed by observation of the refractive index of the reaction mass taken from time to time after starting the heating. The refractive index of the polymer, which was polyallyl acetate, is considerably higher than that of the monomer so that an increase of refractive index indicated that polymerization was occurring. A blank to which no salt was added was similarly heated for comparison. The values given in the body of the table are the increase in fourth decimal place unit of the refractive index $$(\Delta n 20/4 \times 10^4)$$

for the indicated time from start.

Table 1

| Hours | Blank | $CdCl_2$ | $CdBr_2$ | $HgCl_2$ | $PbCl_2$ |
|---|---|---|---|---|---|
| 26 | | | 24 | | |
| 66 | 16 | | | | |
| 80 | | | 44 | | |
| 93 | | | | | |
| 118 | | | | 34 | |
| 182 | 16 | | | | |
| 186 | 20 | | | 72 | |
| 203 | | | 83 | | |
| 229 | | | | 49 | |
| 294 | 29 | | | | |
| 296 | | | 146 | 70 | |
| 311 | | | | | |
| 388 | | | | | 103 |
| 389 | | | | 119 | |
| 390 | | | 195 | | |
| 411 | 36 | | | | |
| 500 | | | 248 | | 125 |
| 504 | | | | 129 | |
| 528 | 51 | | | | 151 |
| 618 | | | | | 181 |
| 645 | 56 | | | | |
| 717 | 60 | | | | |
| 730 | | | | | 230 |
| 834 | 64 | | | | |
| 847 | | | | | |
| 942 | 66 | | | | 264 |
| 964 | | | | | 311 |
| Average rate of increase in units per hour | 0.088 | 0.482 | 0.274 | 0.329 | 0.332 |

The increase in refractive index is approximately proportional to the rate of polymer formation at the substantially uniform temperature employed and the results tabulated above indicate that while the heating of the allyl acetate in the absence of a catalyst slowly effects the polymerization of the ester, the rate of polymer formation is considerably improved by the presence of the salts.

The compounds polymerized according to the process of the invention are unsaturated esters of a monocarboxylic acid and the esters contain a single olefinic bond. Although the salts catalyzed polymerization of any polymerizable unsaturated compound, the esters employed are those of monocarboxylic acids devoid of any polymer-promoting group, and the process does not contemplate polymerization of esters of acrylic acid, crotonic acid, cinnamic acid, etc. The esters are derived from a mono-unsaturated alcohol having an olefinic linkage between two carbon atoms one of which contains at least one hydrogen atom linked directly thereto and one of which is linked directly to a saturated carbon atom containing the hydroxyl group linked directly thereto. Preferably the ester is derived from a mono-unsaturated alcohol containing a vinylidene group directly linked to a saturated carbon atom to which is linked the hydroxyl group. Unsaturated esters of aromatic acids such as benzoic acid, toluic acid, and the like, are included within the purview of the invention since the lack of saturation of the carbon atoms in the aromatic ring of such compounds is responsible for no polymerizable unsaturated groups therein because of the well-known peculiarities of aromatic nuclei. The esters of saturated monocarboxylic acids constitute a preferred group while esters of simple saturated acids are particularly preferred. Also included are those esters of saturated aliphatic acid wherein one or more hydrogen atoms have been substituted by a halogen atom, a hydroxyl group, an alkoxy group, an aryl oxy group and like groups. Among the preferred reactants are included such compounds as allyl formate, allyl acetate, allyl propionate, allyl isobutyrate, beta-methallyl acetate, beta-chlorallyl acetate, beta-ethylallyl formate, beta-phenylallyl acetate, beta-methoxy-allyl acetate, beta-chloromethylallyl acetate, allyl benzoate, beta-methylallyl propionate allyl toluate, allyl salicylate, allyl glycolate, allyl methoxyacetate, beta-methylallyl chloracetate, allyl beta-chloropropionate, allyl lactate, allyl naphthenate, beta-methylallyl chlorobenzoate, allyl alpha-hydroxy isobutyrate, allyl acetylglycolate, allyl stearate, allyl luvulinate, beta-methylallyl butyrate, alpha-methylallyl acetate, alpha-phenylallyl acetate, allyl ethoxy-formate, beta-methylallyl phenoxyformate, allyl naphthoate, allyl ester of hydrogenated abietic acid, and the like.

The preferred compounds of the group may be represented by the general formula,

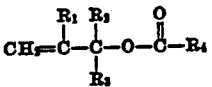

wherein $R_1$, $R_2$ and $R_3$ represent hydrogen atoms, halogen atoms or hydrocarbon radicals and $R_4$ represents a hydrogen atom or an organic radical devoid of a polymerizable unsaturated group, such as an alkyl group, an aryl group, an alicyclic group, an aralkyl group, an alkoxy group, an aryloxy group, and the like.

Less preferred esters include compounds like crotyl acetate, crotyl propionate, crotyl benzoate, 2-hexenyl acetate, 2-pentenyl formate, 2-isopentenyl chloracetate, methyl isobutenyl carbinyl butyrate, and similar types of ester.

The polymerization is effected by heating the unsaturated ester under anhydrous conditions in the presence of or in contact with the catalyst salts at a temperature of 50° C. to 150° C. with the ester in the liquid phase. With unsaturated esters of sufficiently low melting point so that they are liquid under the reaction conditions, the ester is polymerized in the process per se. The use of higher esters requires the use of an inert solvent in order to have the reaction mixture liquid in effecting the polymerization. For this purpose solvents such as saturated esters like ethyl acetate, isopropyl acetate, butyl acetate, etc.; hydrocarbons like benzene, toluene, hexane, octanes, etc.; ethers like dioxane, dibutyl ether, beta-dichloro-diethyl ether, etc., are admixed with the unsaturated ester subjected to polymerization. In general, however, it is preferred to avoid the use of solvents or diluents where possible since they complicate the recovery problem in obtaining the polymer and decrease the rate of the polymerization reactions. It is preferred to employ as reactant an unsaturated ester which is liquid under the reaction conditions as is realized with lower esters or esters of lower unsaturated alcohols. These preferred reactants contain not more than seven carbon atoms in the unsaturated ester.

While the salts employed as catalysts dissolves to a greater or lesser extent in the reaction material, they are normally soluble in only minute amounts so that the reaction mixture is contacted with the catalyst as a crystalline substance. For this reason it is preferable to utilize the salt in a finely divided or comminuted state. The amount of catalyst employed in the process is at least 0.05% of the unsaturated ester subjected to polymerization, but can range upwards to any desired amount, although for practical reasons it is usual to employ about 0.5%. The rate of polymerization increases somewhat with increasing amounts of catalyst. This effect is evident from the results given in Table II below, obtained by polymerizing allyl acetate under refluxing conditions with the indicated amounts of cadmium chloride. The values in the body of the table are the increase in refractive index in fourth decimal place units obtained by determination of the refractive index at the indicated times. Results obtained with no catalysts are listed for comparison.

Table II

| Hours | CdCl₂ | | | | |
| --- | --- | --- | --- | --- | --- |
| | None | 0.05% | 0.5% | 2.0% | 5.0% |
| 66 | 16 | | | | |
| 87 | | 23 | | | 30 |
| 88 | | | 37 | 47 | |
| 118 | 16 | | | | |
| 182 | 20 | | | | |
| 202 | | | 49 | 67 | |
| 204 | | | | | 72 |
| 276 | | 44 | | | 80 |
| 294 | 29 | | | | |
| 304 | 36 | | | | |
| 411 | | 46 | | | 96 |
| 494 | | | | | |
| 528 | 51 | | | | 106 |
| 607 | | | | | |
| 645 | 56 | | | | |
| Average rate of increase in units per hour | 0.096 | 0.141 | 0.320 | 0.420 | 0.234 |

It is seen that increasing the amount of catalyst from 0.05% to 5% or about one hundred fold approximately doubles the rate of increase in refractive index. Since the amount of polymer formed is approximately proportional to the increase in refractive index, the one hundred fold increase in catalyst concentration about doubled the rate of polymerization.

The halide salts of cadmium, mercury or lead employed as catalyst according to the present invention have advantages in polymerizing the unsaturated esters not realized with known peroxidic catalysts such as benzoyl peroxide, one of the most commonly used materials for this purpose. Since the salts are essentially insoluble in the reaction mixture, the polymer obtained is not contaminated with undesirable materials such as benzoic acids as when benzoyl peroxide is utilized. Further, upon completion of the polymerization operation the catalyst is filtered from the reaction mixture and can be used again in the process. In view of these advantages it is evident that catalyst according to the present invention is reduced to a minimum. It has also been found that when the polyallyl acetate formed by the use of the salts is subjected to alcoholysis to give polyallyl alcohol, the rate of reaction is higher and the ease of preparation better when the polyallyl acetate is prepared using one of the salts rather than a peroxide catalyst like benzoyl peroxide.

In executing the process of the invention the unsaturated ester to which had been added an amount of catalyst is heated to between 50° C. and 150° C. and the heating continued until the desired degree of polymerization has occurred. The polymers of the unsaturated esters are linear polymers which are soluble generally in the monomeric material. After 25% to 35% or more of the reactant has been converted to polymer, as may be determined by observation of increase of the refractive index, the heating is discontinued and the reaction material filtered to remove catalyst. The filtered material is then subjected to distillation to separate unreacted monomer, the polymers remaining as residue. If desired, any trace of catalyst salt or other material retained by the polymer is removed by water-washing. It is usually desirable to choose a reactant which will boil within the range of reaction temperature whereby the polymerization is effected by refluxing the material in the presence of the catalyst. The presence or absence of oxygen appears to have no significant effect on the rate of the polymerization reaction when the catalysts of the present invention are employed.

In some cases it is desirable to intermittently add fresh catalyst to the reaction material during the course of the heating rather than adding the entire amount at the start. The rate of polymerization is increased by intermittently adding fresh catalyst to the reaction mass during the course of the heating rather than adding the entire amount at the start. This is evident from the results obtained and listed in Table III in polymerizing allyl acetate. In one experiment 0.5% cadmium chloride was added each week for four weeks giving a total amount of catalyst of 2%. To another quantity of allyl acetate 2% cadmium chloride was added at the start of the heating. Results of a third experiment are given for comparison during which no catalyst was used. Each of the polymerizations was effected at normal refluxing temperature and the values in the body of the table are the increase of refractive index in fourth decimal units ($\Delta n 20/D \times 10^4$) from observations taken at the indicated times from start of heating.

Table III

| Hours from start | Blank | 0.5% CdCl$_2$ added each week for 4 weeks | 2.0% CdCl$_2$ added at start |
|---|---|---|---|
| 66 | | 16 | 84 |
| 88 | | | 47 |
| 118 | | 16 | |
| 182 | | 20 | |
| 202 | | | 174 |
| 294 | 29 | | 67 |
| Average rate of increase in units per hour | 0.122 | 0.997 | 0.456 |

Another method of effecting the reaction which is adapted for continuous production of polymer realized with the catalyst salts is to pass the liquid reactant material through a bed of the salt. In adapting this procedure to continuous operation the organic material is circulated through a bed of the catalyst maintained at the desired temperature and monomeric ester is fed into the cycling system while reaction material is withdrawn therefrom, the withdrawn portion being a mixture of polymer and monomer from which the monomer is recovered for return to the cycling system.

The polymers prepared according to the invention have application as plasticizers and softeners for various materials. Further, the solubility in various substances makes the polymeric esters useful intermediates in the synthesis of polymeric alcohols which may be prepared by hydrolysis or saponification of the polymers.

For the purpose of further illustrating the invention, the following example is given, but it is to be understood that the invention is not to be construed as limited to any details given therein.

*Example*

A mixture of about 1861 grams of allyl acetate and 9.3 grams (0.5%) of anhydrous cadmium chloride was refluxed for 554 hours. At the end of this period the refractive index had risen from 1.4044 to 1.4283, a gain of 0.0239 units. The catalyst was filtered off and 1768 grams of the filtrate was distilled at 130° C. under 1 mm. pressure in a current of carbon dioxide gas in order to remove unreacted monomer. The distillate consisted of 1151 grams of allyl acetate having a refractive index of $n20/D = 1.4044$ or a recovery of 65.1%. The residue which was polyallyl acetate weighed 1617 grams, so that a conversion to polymer of 34.9% was realized. The polymer was a yellow viscous mass possessing a slight haziness which apparently was not due to catalyst remnants, but which could be removed by washing with water. The polyallyl acetate obtained in this manner analyzed as follows:

| | Found | Calculated |
|---|---|---|
| Refractive index, 20/D | 1.4788 | |
| Ester value, equiv. per 100 gms | 0.982 | 1.000 |
| Acidity, equiv. per 100 gms | 0.004 | 0.000 |
| Chlorine, per cent (Volhard) | 0.05 | 0.0 |
| Bromine No., gms. per 100 gms | 4 | |
| Molecular weight (cryoscopic in acetic acid) | 780 | |
| Cadmium, per cent | Less than 0.001 | |
| Carbon, per cent | 59.2 | 60.0 |
| Hydrogen, per cent | 8.0 | 8.0 |

We claim as our invention:

1. A process for the production of a polymer of an ester of a monocarboxylic acid and a monohydric alcohol having an olefinic linkage between two carbon atoms one of which contains at least one hydrogen atom linked directly thereto and the other of which is linked directly to a saturated carbon atom having the hydroxyl group linked directly thereto, said ester containing only double-bonded unsaturation and no other elements than carbon, hydrogen, oxygen and halogen and also containing but a single olefinic linkage therein, which consists of heating the ester in liquid phase under anhydrous and non-oxidizing conditions at a temperature between 50° C. and 150° C. for a time sufficient to effect appreciable polymerization of the ester, said heating being effected with the ester in the presence of a salt of the formula MX$_2$, wherein M is a metal of the group consisting of cadmium, mercury and lead and X is a halogen of the group consisting of fluorine, chlorine and bromine.

2. A process for the production of polymer of an ester of a saturated monocarboxylic acid and a mono-olefinic monohydric alcohol having a vinylidene group directly linked to a saturated carbon atom to which is directly linked the hydroxyl group, said ester containing only double-bonded unsaturation and no other elements than carbon, hydrogen, oxygen and halogen, which consists of heating the ester in liquid phase under anhydrous and non-oxidizing conditions at a temperature between 50° C. and 150° C. for a time sufficient to effect appreciable polymerization of the ester, said heating being effected with the ester in the presence of a salt of the formula $MX_2$, wherein M is a metal of the group consisting of cadmium, mercury and lead and X is a halogen of the group consisting of fluorine, chlorine and bromine.

3. A process for the production of a polymer of an allyl ester of a saturated monocarboxylic acid, said ester containing not more than 7 carbon atoms, which consists of heating the ester in liquid phase under anhydrous and non-oxidizing conditions at a temperature between 50° C. and 150° C. for a time sufficient to effect appreciable polymerization of the ester, said heating being effected with the ester in the presence of a salt of the formula $MX_2$, wherein M is a metal of the group consisting of cadmium, mercury and lead and X is a halogen of the group consisting of fluorine, chlorine and bromine.

4. A process for the production of polyallyl acetate which consists of heating in a liquid phase allyl acetate under anhydrous and non-oxidizing conditions at a temperature between 50° C. and 150° C. in the presence of a salt of the formula $MX_2$ wherein M represents a metal from the class consisting of cadmium, mercury and lead and wherein X represents a halogen atom from the group consisting of fluorine, chlorine and bromine, said heating being continued for a time sufficient to effect appreciable polymerization of the allyl acetate.

5. A process for the production of polymer of an ester of a saturated monocarboxylic acid and a mono-olefinic monohydric alcohol having a vinylidine group directly linked to a saturated carbon atom to which is directly linked the hydroxyl group, said ester containing only double-bonded unsaturation and no other elements than carbon, hydrogen, oxygen and halogen, which consists of heating the ester in liquid phase under anhydrous and non-oxidizing conditions at a temperature between 50° C. and 150° C. for a time sufficient to effect appreciable polymerization of the ester, said heating being effected with the ester in the presence of a salt of the formula $MX_2$, wherein M is a metal of the group consisting of cadmium, mercury and lead and X is a halogen of the group consisting of fluorine, chlorine and bromine, and during the course of said heating intermittently adding said salt to the reaction mixture.

6. A process for the production of polyallyl acetate which consists of boiling allyl acetate at atmospheric pressure under anhydrous and non-oxidizing conditions in the presence of cadmium chloride for a time sufficient to effect appreciable polymerization of the allyl acetate.

7. A process for the production of polyallyl acetate which consists of boiling allyl acetate at atmospheric pressure under anhydrous and non-oxidizing conditions in the presence of mercuric chloride for a time sufficient to effect appreciable polymerization of the allyl acetate.

8. A process for the production of polyallyl acetate which consists of boiling allyl acetate at atmospheric pressure under anhydrous and non-oxidizing conditions in the presence of lead chloride for a time sufficient to effect appreciable polymerization of the allyl acetate.

DAVID E. ADELSON.
HAROLD F. GRAY, Jr.
ROBERT P. RUH.